United States Patent [19]
Farha, Jr.

[11] 3,906,009
[45] Sept. 16, 1975

[54] OXIDATIVE DEHYDROGENATION OF ALKENES OF ALKADIENES TO FURAN COMPOUNDS USING CERTAIN V-P CATALYTS

[75] Inventor: Floyd E. Farha, Jr., Bartlesville, Okla.

[73] Assignee: Phillips Petroleum Company, Bartlesville, Okla.

[22] Filed: July 16, 1973

[21] Appl. No.: 379,824

[52] U.S. Cl. ............................ 260/346.1 R; 260/461
[51] Int. Cl. ............................................. C07d 5/16
[58] Field of Search ............................ 260/346.1 R

[56] References Cited
OTHER PUBLICATIONS

Ai, Kogyo Kagaku Zasshi 1971, 74(2) p. 183–186; Chemical Abstracts (1971), Vol. 74, 125302.

*Primary Examiner*—Henry R. Jiles
*Assistant Examiner*—Bernard I. Dentz

[57] ABSTRACT

Alkenes and/or alkadienes are contacted with molecular oxygen and an oxidative dehydrogenation catalyst consisting essentially of phosphorus, vanadium, and oxygen, wherein the vanadium-to-phosphorus atom ratio is in the range of about 2:1 to about 12:1, to produce furan compounds.

9 Claims, No Drawings

OXIDATIVE DEHYDROGENATION OF ALKENES OF ALKADIENES TO FURAN COMPOUNDS USING CERTAIN V-P CATALYTS

This invention relates to oxidative dehydrogenation catalysts and the use thereof for the conversion of alkenes and/or alkadienes to furan compounds.

Furan compounds can react readily with oxygen under oxidation conditions to produce ring cleavage and the formation of polymers. Accordingly, the production of furan compounds by the oxidative dehydrogenation of hydrocarbons has generally been avoided. Recently it has been discovered that furan compounds can be produced by the oxidative dehydrogenation of hydrocarbons in the presence of certain specific catalysts without substantial conversion of the furan compounds to undesirable products. The search for additional catalysts suitable for this reaction continues.

Accordingly, it is an object of the present invention to provide a new and improved oxidative dehydrogenation catalyst. Another object of the invention is to provide a new and improved process for the conversion of alkenes or alkadienes to furan compounds. Other objects, aspects and advantages of the invention will be apparent from a study of the specification and the appended claims to the invention.

In accordance with the present invention there is provided an improved catalyst for the production of furan type compounds from unsaturated acyclic hydrocarbons having from 4 to 10 carbon atoms, particularly alkenes and alkadienes having from 4 to 10 carbon atoms, which catalyst consists essentially of vanadium, phosphorus, and oxygen, wherein the atom ratio of vanadium to phosphorus is in the range of about 2:1 to about 12:1, preferably in the range of about 3:1 to about 7:1.

If desired, the catalysts can be supported on conventional solid catalytic support materials, for example zinc oxide, silica, alumina, boria, magnesia, titania, zirconia, and mixtures thereof. Where a catalyst support is employed, the support will generally constitute from about 10 to about 98, preferably from about 75 to about 95, weight percent of the total catalyst composition. Supports having a surface area in the range of about 2 to about 50 m$^2$/g and preferably in the range of about 5 to about 20 m$^2$/g are desirable. The atom ratio of vanadium to phosphorus will generally be in the range of about 2:1 to about 12:1, and preferably will be in the range of about 3:1 to about 7:1.

The catalysts of the present invention can be prepared by many suitable techniques, for example coprecipitation, impregnation, ion exchange, aqueous or nonaqueous solution or suspension mixing, or dry mixing. In general, any method can be employed which will provide a composition containing the desired elements in the defined proportions, and which has a catalytic surface area of in the range of about 0.05 to about 20 m$^2$/g, preferably in the range of about 0.1 to about 5 m$^2$/g. Thus the catalyst components and/or compounds thereof can be combined in any suitable manner. Any compound of vanadium or phosphorus can be employed in the preparation of the catalyst so long as none of the compounds are detrimental to the final oxidative dehydrogenation catalyst and essentially all of the elements in the compounds employed, other than the vanadium, phosphorus, and oxygen, are removed from the final catalyst by washing or by volatilization. However, small or trace amounts of some other elements which can be involved in the preparation of the catalyst can be tolerated in the final catalytic composition. For example, if alkali metal or alkaline earth metal hydroxides are employed in the preparation of the catalyst, very small residual amounts of such alkali metal and the alkaline earth metals are not detrimental. Similarly, if vanadium sulfate is employed in the preparation of the catalyst, small residual amounts of sulfur can be tolerated.

Generally, however, the preferred vanadium compounds are the oxides or phosphates of vanadium or compounds which are converted to the oxide or phosphate on calcination. Thus, suitable compounds include the oxides, phosphates, halides, sulfates, vanadates and the like, and mixtures thereof. The preferred phosphorus compounds include vanadium phosphate, the phosphorus oxides, the ammonium phosphates, and the various forms of phosphoric acids, and admixtures thereof. Examples of compounds of vanadium include vanadium oxide, ammonium vanadate, vanadium sulfate, vanadium phosphate; and examples of compounds of phosphorus include phosphoric acid, phosphorus pentoxide, diammonium hydrogen phosphate, and the like. The term "phosphate" includes not only the monophosphate ion, PO$_4^{-3}$, but also polyphosphate ions (PnO$_{3n+1}$)$^{-(n+2)}$ AND [PnO$_{3n-1}$(OH)$_2$]$^{-n}$ in which $n$ is an integer in the range of 2 through 100.

One technique for forming an unsupported catalyst of the present invention comprises one or more phosphorus compounds and one or more vanadium compounds.

The compounds can be admixed in the form of dry compounds and then calcined. They can be admixed in the presence of a diluent to form a paste and/or one of the components can be employed in liquid form, such as phosphoric acid, to form the paste. If desired, the paste can be dried before calcining. A particle forming step such as pelletizing or screening can precede the drying step or the calcining step.

A technique for forming a supported catalyst of the present invention comprises sequentially impregnating the support with solutions or dispersions of each component compound, drying and calcining the impregnated support.

The calcining step will be accomplished under conditions which ensure the conversion of any non-oxide or non-phosphate compounds to the oxide or phosphate form and the volatilizing of any undesired elements. In general the calcining step comprises heating the catalyst composition to a temperature in the range of about 800° to about 1500°F for a time in the range of about 1 to about 40 hours. Presently preferred calcining conditions comprise a temperature in the range of about 850° to about 1400°F for a time in the range of about 2 to about 24 hours in the presence of a molecular oxygen containing gas, for example, air.

Suitable feeds for conversion to furan compounds include the unsaturated acyclic hydrocarbons, particularly the acyclic alkenes and acyclic alkadienes having from 4 to 20 carbon atoms. Examples include n-butene-1, butene-2, n-pentene-1, isopentene, hexene-1, heptene-2, octene-1, decene-1, 2-methylbutene1, hexene-3, 2-ethylbutene-1, 2-methylpentene-3, 3-ethylhexene-2, butadiene-1,3, pentadiene-1,3, isoprene, hexadiene-1,3, decadiene-1,3, and the like, and mixtures thereof. The acyclic alkadienes having from 4 to 5 carbon atoms are presently preferred.

The furan compounds produced by the process of the present invention have the formula

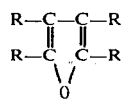

wherein each R is individually selected from the group consisting of hydrogen and alkyl radicals having from 1 to 6 carbon atoms, the total carbon atoms in the R radicals being in the range of 0 to 6. Representative products include furan, 2-methylfuran, 3-methylfuran, 2,5-diethylfuran, 2-n-hexylfuran, 2-isopropyl-3-methylfuran, 3-n-propylfuran, 3-methyl-4-n-butylfuran, and the like.

In accordance with the present invention a hydrocarbon feed comprising one or more alkenes and/or one or more alkadienes is contacted, under suitable reaction conditions for conversion to furan compounds, with a molecular oxygen containing gas in the presence of the hereinabove defined catalyst. The molecular oxygen containing gas can be high purity oxygen, oxygen diluted with an inert diluent such as nitrogen, flue gas containing residual oxygen, air, or any other source of molecular oxygen which is at least essentially free of contaminants which would be detrimental to the desired reaction. In a presently preferred embodiment, the oxidative dehydrogenation process is carried out in the absence of any halogen. In general, the temperature will be in the range of about 500° to about 1200°F, preferably will be in the range of about 600° to about 1100°F, and more preferably in the range of about 700° to about 1000°F. Any suitable pressure can be employed, but in general the pressure will be in the range of about 0.05 to about 250 psig, and preferably will be in the range of about 0.1 to about 25 psig. The hydrocarbon feed rate will generally be in the range of about 10 to about 1000 standard cubic feet of alkenes and/or alkadienes per hour per cubic foot of catalyst bed (GHSV), preferably will be in the range of about 20 to about 500 GHSV, and more preferably in the range of about 50 to about 300 GHSV. The mol ratio of molecular oxygen to alkenes and alkadienes will generally be in the range of about 0.1:1 to about 3:1, and preferably will be in the range of about 0.5:1 to about 2:1. Steam can be employed in the reaction zone as a diluent and heat transfer agent. When steam is utilized, the mol ratio of steam to alkenes and alkadienes will generally be in the range of about 0.1:1 to about 100:1, preferably will be in the range of about 2:1 to about 90:1, and more preferably in the range of about 5:1 to 50:1.

The alkenes, if present, are largely converted to the corresponding alkadienes. The alkadienes, in turn, are converted in significant quantities to the corresponding furan compounds. However, the reaction effluent can also contain unreacted feed material, alkenes including ethylene, propylene, and butenes, water, oxides of carbon, alkenylcycloolefins, crotonaldehyde, acetaldehyde and other oxygenated products. The furan compounds can be recovered by suitable techniques, for example by condensation from the reactor gas effluent followed by distillation. Unconverted alkenes and/or alkadienes can be recovered and recycled to the reactor, as can other materials such as crotonaldehyde which are convertible to furan compounds under the reaction conditions. If desired, the conversion of alkenes to furan compounds can be conducted in two reaction zones in series. The first reaction zone can be operated under conditions favorable for the conversion of the alkenes to alkadienes, while the second reaction zone can be operated under conditions favorable to the conversion of the alkadienes to furan compounds. The effluent from the first reaction zone can be subjected to conventional separation techniques to recover unconverted alkenes for recycle to the first reaction zone and a concentrated alkadiene stream for feed to the second reaction zone. If desired, the total effluent from the first reaction zone can be passed directly to the second reaction zone without separation. The effluent of the second reaction zone can be processed for recovery and recycle of unreacted alkadienes to the second reaction zone and for recovery of a furan compound product. The catalyst of the present invention can be employed in both reaction zones, or another suitable dehydrogenation catalyst can be employed in the first reaction zone while the present catalyst is utilized in the second reaction zone.

The following example is presented in further illustration of the invention and should not be construed in undue limitation thereof.

EXAMPLE

A catalyst was prepared from 30 grams of ammonium vanadate and 8 cc of 85% $H_3PO_4$. The resulting slurry was calcined for 3 hours at 1000°F in air, cooled and ground to 20 to 30 mesh. The catalyst had a V/P atom ratio of 3.4/1, calculated on the basis of a phosphorus content of 8.2 wt. % estimated from a plot of cc $H_3PO_4$ versus percent phosphorus. The calculated composition was 8.2 wt. % phosphorus, 45.4 wt. % vanadium and 46.4 wt. % oxygen.

The catalyst was used in converting a butadiene-1,3 feed into oxygenated products as shown in the following runs at atmospheric pressure. Six cubic centimeters of the catalyst was employed in each run:

TABLE

| Run No. | Feed Rate GHSV | Steam/Feed Mol Ratio | Oxygen[a]/feed Mol Ratio | Temp., °F | Conversion[b] | Yields[c] | | Selectivity | |
|---|---|---|---|---|---|---|---|---|---|
| | | | | | | Furan | Acetaldehyde | Furan | Acetaldehyde + Furan |
| 1 | 100 | 20 | 0.5 | 900 | 28.7 | 7.2 | 2.9 | 25.0 | 35.2 |
| 2 | 100 | 20 | 0.5 | 1100 | 31.5 | 6.2 | 2.5 | 19.8 | 27.8 |
| 3 | 400 | 20 | 0.5 | 1100 | 8.9 | 2.6 | 0.75 | 29.5 | 38.0 |
| 4 | 400 | 20 | 0.5 | 900 | 5.2 | 1.9 | 0.62 | 37.0 | 49.0 |

[a] from air
[b] per 100 mols feed
[c] per 100 mols feed

The gaseous effluents, on a dry basis, were analyzed by means of gasliquid chromatography. Products found included butadiene, furan, acetaldehyde, carbon oxides, ethylene, propylene and butenes. The reported selectivities to furan and furan plus acetaldehyde are modified selectivities based on the above gaseous product analyses. The yields of furan and acetaldehyde are in terms of mols per 100 mols of butadiene feedstock.

The results show that furan and acetaldehyde are made from butadiene 1,3 in all instances. However, the best yields, particularly for furan, are obtained at the lower feed rate (100 GHSV) and at the lower reactor temperature (900°F). Raising the reactor temperature while maintaining the lower feed rate results in diminishing the yield and selectivity to furan and acetaldehyde although conversion is slightly improved. At the higher feed rate (400 GHSV), conversions and yields are markedly decreased although selectivities to furan and acetaldehyde are somewhat improved, especially at the lower reactor temperature.

Reasonable variations and modifications are possible within the scope of the foregoing disclosure and the appended claims to the invention.

That which is claimed:

1. A process which comprises reacting at least one unsaturated acyclic feed hydrocarbon selected from the group consisting of alkenes and alkadienes having 4 to 10 carbon atoms, with oxygen in contact with a catalyst consisting essentially of phosphorus, vanadium and oxygen, wherein the atom ratio of vanadium to phosphorus is in the range of about 2:1 to about 12:1, under suitable reaction conditions for conversion of said at least one unsaturated acyclic feed hydrocarbon to at least one furan compound having the formula

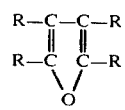

wherein each R is individually selected from the group consisting of hydrogen and alkyl radicals having from 1 to 6 carbon atoms, the total carbon atoms in the R radicals being in the range of 0 to 6; and recovering at least a portion of the furan compounds thus produced.

2. A process in accordance with claim 1 wherein said reaction conditions comprise a temperature in the range of about 500° to about 1200°F, an unsaturated acyclic hydrocarbon feed rate in the range of about 10 to about 1000 GHSV, and a mol ratio of oxygen to unsaturated acyclic feed hydrocarbon in the range of about 0.1:1 to about 3:1.

3. A process in accordance with claim 1 wherein the atom ratio of vanadium to phosphorus in said catalyst is in the range of about 3:1 to about 7:1.

4. A process in accordance with claim 1 wherein said feed hydrocarbon is an alkadiene having 4 to 5 carbon atoms.

5. A process in accordance with claim 1 wherein said feed hydrocarbon comprises butadiene.

6. A process in accordance with claim 1 wherein said reaction conditions comprise a temperature in the range of about 700° to about 1000°F, an unsaturated acyclic hydrocarbon feed rate in the range of about 50 to about 300 GHSV, and a mol ratio of oxygen to unsaturated acyclic feed hydrocarbon in the range of about 0.5:1 to about 2:1.

7. A process in accordance with claim 6 wherein said catalyst consists of phosphorus, vanadium, and oxygen, and the atom ratio of vanadium to phosphorus in said catalyst is in the range of about 3:1 to about 7:1.

8. A process in accordance with claim 7 wherein said feed hydrocarbon is an alkadiene having 4 to 5 carbon atoms.

9. A process in accordance with claim 7 wherein said feed hydrocarbon comprises butadiene.

* * * * *